(12) United States Patent
Badawy et al.

(10) Patent No.: US 12,537,496 B2
(45) Date of Patent: Jan. 27, 2026

(54) IMPULSE NOISE MITIGATION IN COMMUNICATION SYSTEMS

(71) Applicant: Telefonaktiebolaget LM Ericsson (publ), Stockholm (SE)

(72) Inventors: Ahmed Badawy, Kanata (CA); Khaled Yousef, Solna (SE); Ping Liu, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 269 days.

(21) Appl. No.: 18/245,731

(22) PCT Filed: Sep. 25, 2020

(86) PCT No.: PCT/IB2020/059021
§ 371 (c)(1),
(2) Date: Mar. 17, 2023

(87) PCT Pub. No.: WO2022/064257
PCT Pub. Date: Mar. 31, 2022

(65) Prior Publication Data
US 2023/0361738 A1    Nov. 9, 2023

(51) Int. Cl.
*H03G 3/32* (2006.01)
*H03G 3/34* (2006.01)

(52) U.S. Cl.
CPC ............ *H03G 3/347* (2013.01); *H03G 3/32* (2013.01)

(58) Field of Classification Search
CPC .......... H03G 3/347; H03G 3/32; H03G 3/345
USPC ............................ 381/2–4, 55–56, 58, 71.11
See application file for complete search history.

(56) References Cited

U.S. PATENT DOCUMENTS

| | | | |
|---|---|---|---|
| 8,792,543 B2 | 7/2014 | Lo et al. | |
| 2008/0280582 A1 | 11/2008 | Su | |
| 2009/0005890 A1* | 1/2009 | Zhang | G11B 27/28 700/94 |
| 2009/0214048 A1* | 8/2009 | Stokes, III | H04B 3/23 381/66 |
| 2010/0086139 A1* | 4/2010 | Nicolino, Jr. | G10K 15/02 381/56 |
| 2014/0010273 A1 | 1/2014 | Tarafi et al. | |
| 2014/0214214 A1* | 7/2014 | Asmus | F24F 11/62 702/183 |

(Continued)

FOREIGN PATENT DOCUMENTS

| | | |
|---|---|---|
| EP | 1 548 707 A2 | 6/2005 |
| WO | 2012/085431 A1 | 6/2012 |

OTHER PUBLICATIONS

International Search Report and Written Opinion dated Jun. 22, 2021 issued in PCT Application No. PCT/IB2020/059021 filed Sep. 25, 2020, consisting of 14 pages.

(Continued)

*Primary Examiner* — George C Monikang
(74) *Attorney, Agent, or Firm* — Sonoda & Kobayashi Intellectual Property Law; Darren M. Gardner

(57) ABSTRACT

A method, network node and wireless device (WD) for suppressing impulsive noise are provided. According to one aspect, a method includes determining a moving difference of successive samples of a received signal, comparing the moving difference to a threshold, and setting the successive samples to a predetermined value when the moving difference exceeds the threshold.

20 Claims, 16 Drawing Sheets

(56) References Cited

U.S. PATENT DOCUMENTS

2014/0314185 A1 10/2014 Park et al.

OTHER PUBLICATIONS

Tareq Y. Al-Naffouri et al., Impulse Noise Estimation and Removal for OFDM Systems; IEEE Transactions on Communications, vol. 62, No. 3, Mar. 2014, consisting of 14 pages.
Michael Cheffena, Propagation Channel Characteristics of Industrial Wireless Sensor Networks; Wireless Corner; IEEE Antennas & Propagation Magazine, Feb. 2016, consisting of 8 pages.
S. Niranjayan et al., Novel Adaptive Nonlinear Receivers for UWB Multiple Access Communications; IEEE Transactions on Wireless Communications, vol. 12, No. 5, May 2013, consisting of 10 page.
Khaled M. Rabie et al., Preprocessing-Based Impulsive Noise Reduction for Power-Line Communications; IEEE Transactions on Power Delivery, vol. 29, No. 4, Aug. 2014, consisting of 11 pages.
Sanjeev Sharma et al., Sparsity-Based Monobit UWB Receiver Under Impulse Noise Environments; IEEE Wireless Communications Letters, vol. 8, No. 3, Jun. 2019, consisting of 4 pages.

\* cited by examiner

—— WITHOUT IN
—— WITH IN
----- PROPOSED

IMPULSE NOISE MITIGATION IN COMMUNICATION SYSTEMS

CROSS-REFERENCE TO RELATED APPLICATION

This application is a Submission Under 35 U.S.C. § 371 for U.S. National Stage Patent Application of International Application Number: PCT/IB2020/059021, filed Sep. 25, 2020, entitled "IMPULSE NOISE MITIGATION IN COMMUNICATION SYSTEMS," the entirety of which is incorporated herein by reference.

TECHNICAL FIELD

This disclosure relates to wireless communication and in particular, to impulse noise mitigation in wireless communication systems.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Other wireless communication systems in unlicensed spectra, such as Wi-Fi, may be employed instead of or in addition to and in cooperation with LTE and NR.

In these and other wireless communication systems, noise is present. Noise can be categorized into stationary and impulsive. Stationary noise is referred to as additive white Gaussian Noise (AWGN), which arises from various sources such as thermal vibration and flow of charges of different components inside the receiver. AWGN has a uniform power spectrum and its time domain samples follow a normal distribution with zero mean. On the other hand, impulsive noise (IN) has very short duration, i.e., generated in short bursts, but with very high power (30 dB to 60 dB higher than AWGN level) and arrives at random times. IN can arise from sources including electromagnetic interference from ignition systems, motors and heavy machinery that exist in harsh factory environments and multiple access interference. Moreover, glitches caused by setting and releasing the analog attenuators used for automatic gain control (AGC) in the receiver can also be modelled as IN. IN, particularly in-band IN, which cannot be filtered out, can lead to significant degradation in the performance of the receiver. In particular, IN leads to significant increase in the bit error rate (BER) as well as reduction of the throughput of the communication system. Hence, devising techniques to mitigate the impact of IN is crucial for many applications.

One known solution for mitigating out-of-band impulsive noise (that is, impulsive noise that is outside the frequency band of the desired signal) includes using two sets of high pass filters. The implementation costs of these filters are high and do not address in-band impulsive noise. Another known solution uses conversion to the frequency domain and conversion to the time domain, but has high implementation complexity and associated latency and requires a reference signal.

To mitigate the impact of glitches on the uplink (UL) receiver performance, factory calibration is required to measure the propagation time (delay) between the analog attenuator to the glitch suppression block inside the automatic gain control (AGC) circuit in the radio unit in case those values were not previously measured. This delay needs to be measured precisely per radio unit. The delay is then saved in a database or memory to be retrieved when glitch suppression is triggered by an AGC event. The glitch suppression block needs to precisely wait for this delay when triggered in order to zero out the glitch or apply a window to it. This increases the cost associated with measuring this delay precisely in the factory per unit. Perfect timing and synchronization is not achieved in real products due to temperature changes affecting the electric length of the radio frequency (RF) transmission line or inaccurate measurement of the delay. Therefore complete mitigation of the glitch won't occur and will also lead to degradation in the performance of the UL receiver.

A different method to mitigate the impact of IN on the receiver is clipping. However, the clipping threshold is set higher than a maximum desired amplitude of the signal. This leaves a large gap for IN to pass and impact the receiver.

Other methods include non-linear and sparsity based methods which require high processing capabilities and perfect channel estimation at the receiver, and yet the performance is sub-optimal.

SUMMARY

Some embodiments advantageously provide a method and system for impulse noise mitigation in wireless communication systems.

To mitigate the impact of impulsive noise on the receiver, a real-time method that operates on the received samples in the time domain and exploits the impulsive nature of the impulsive noise. Some embodiments detect and removes IN in the radio unit prior to sending the received signal to the digital unit for baseband processing. Doing so substantially improves performance of the receiver over known methods. In some embodiments, the samples of the received signal that are affected by impulsive noise are located through a moving difference operation and an adaptive threshold comparison process. The located samples may be then set to a lower value such as zero.

According to one aspect, a network node is configured to mitigate impulsive noise in a receiver of the network node. The network node includes at least one of a radio interface and processing circuitry configured to: determine a moving difference of successive samples of a received signal and compare the moving difference to a threshold. The at least one of the radio interface and processing circuitry is also configured to set the successive samples to a predetermined value when the moving difference exceeds the threshold.

According to this aspect, in some embodiments, the moving difference is determined once for each of M successive samples, M being an integer greater than zero. In some embodiments, the moving difference is of an absolute value of each of successive samples. In some embodiments, N absolute values of the successive samples of the received signal are stored in a circular buffer. In some embodiments, the at least one of the radio interface and processing circuitry is further configured to adaptively determine the threshold. In some embodiments, the threshold is adaptively determined based at least in part on received samples of the received signal after at least one sample is set to the predetermined value. In some embodiments, the adaptively determined threshold is based at least in part on a variance of the received signal. In some embodiments, the adaptively determined threshold is adjusted by an infinite impulse response filter. In some embodiments, the adaptively determined threshold is based at least in part on an average power of a set of samples output after the setting of successive samples to the predetermined value. In some embodiments, comparing the moving difference to the threshold includes differentiating between increased signal power and impulsive noise.

According to another aspect, a method to mitigate impulsive noise in a receiver of a network node is provided. The method includes determining a moving difference of successive samples of a received signal and comparing the moving difference to a threshold. The method also includes setting the successive samples to a predetermined value when the moving difference exceeds the threshold.

According to this aspect, in some embodiments, the moving difference is determined once for each of M successive samples, M being an integer greater than zero. In some embodiments, the moving difference is of an absolute value of each of successive samples. In some embodiments, N absolute values of the successive samples of the received signal are stored in a circular buffer. In some embodiments, the method further includes adaptively determining the threshold. In some embodiments, the threshold is adaptively determined based at least in part on received samples of the received signal after at least one sample is set to the predetermined value. In some embodiments, the adaptively determined threshold is based at least in part on a variance of the received signal. In some embodiments, the adaptively determined threshold is adjusted by an infinite impulse response filter. In some embodiments, the adaptively determined threshold is based at least in part on an average power of a set of samples output after the setting of successive samples to the predetermined value. In some embodiments, comparing the moving difference to the threshold includes differentiating between increased signal power and impulsive noise.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 9 is a plot of the absolute value of a 16 quadrature amplitude modulation (QAM) orthogonal frequency division multiplexed (OFDM) received signal in the presence of IN;

DETAILED DESCRIPTION

Figure 1:
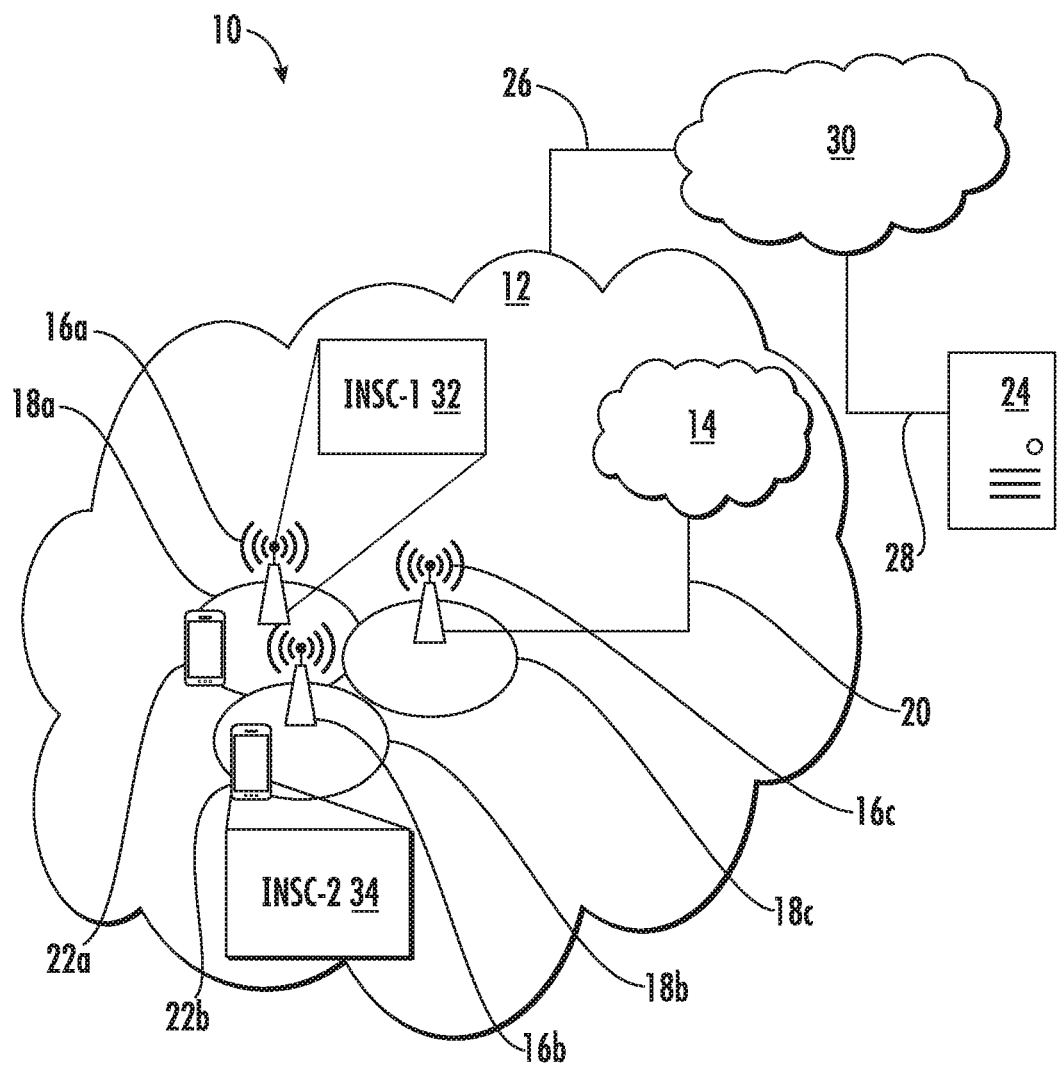
FIG. 1 a schematic diagram of a communication system constructed in accordance with principles set forth herein.

Before describing in detail exemplary embodiments, it is noted that the embodiments reside primarily in combinations of apparatus components and processing steps related to impulse noise mitigation in wireless communication systems. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network, such as a base station (BS), a wireless device (WD), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "network node" used herein may be used to denote a wireless device (WD).

In some embodiments, the non-limiting terms wireless device (WD) or a user equipment (UE) are used interchangeably. The WD herein can be any type of wireless device capable of communicating with another network node such as another WD over radio signals. The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In wideband carrier aggregation applications, a baseband signal contains multiple carriers over a bandwidth that can exceed a few hundred MHz. Over such a large bandwidth, the peak to average power ratio is likely to be different at each carrier frequency. Also, the mean and variance of the signal is likely to be different at each carrier frequency. Thus, in some embodiments, the magnitude and phase difference between signals in the main branch and the peak branch are adaptively adjusted based on statistics of the signal at each carrier frequency. The adaptive adjusting may be responsive to changing signal statistics on a symbol to symbol basis.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22*a*, 22*b* and the host computer 24. The connectivity may be described as an over-the-top (OTT) connection. The connected WDs 22*a*, 22*b* are configured to communicate data and/or signaling via a connection, using the access network 12, the core network 14, any intermediate network 30 and possible further infrastructure (not shown) as intermediaries. The connection may be transparent in the sense that at least some of the participating communication devices through which the connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include an impulsive noise suppression circuit (INSC-1) 32 which is configured to suppress impulsive noise in a receiver of the network node 16.

Similarly, a wireless device 22 is configured to include an impulsive noise suppression circuit (INSC-2) 34 which is configured to suppress impulsive noise in a receiver of the wireless device 22.

Thus, in some embodiments, INSC-1 32 and INSC-2 34 may be similar in operation so that the description of the operation of one will suffice to explain the operation of the other. In some embodiments, not all WDs 22 will have an INSC and in some embodiments, not all network nodes 16 will have an INSC, and in some embodiments, not all radios within a network node 16 will have an INSC.

Example implementations, in accordance with an embodiment, of the WD 22, network node 16 and host computer 24 discussed in the preceding paragraphs will now be described with reference to FIG. 2. The communication system 10 includes a network node 16 provided in a communication system 10 and including hardware 58 enabling it to communicate with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10. The radio interface 62 includes the INSC-1 32. The INSC-1 32 includes a calculator 36 and buffers 38 to compute and store absolute values of digital input samples, as well as perform moving difference calculations, estimate thresholds and compare the moving difference to the estimated threshold.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers. The radio interface 82 includes INSC-2 34 which is configured to amplify signals across a broad frequency band and to adaptively allocate power among main and peak paths and adaptively adjust phase differences between the signals in the main and peak paths. The INSC-2 34 includes a calculator 40 and buffers 42 to compute and store absolute values of digital input samples, as well as perform moving difference calculations, estimate thresholds and compare the moving difference to the estimated threshold.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Note that in some embodiments, the calculators 36 and 40 may be implemented within the processing circuitry 68 and 84, respectively. Also, in some embodiments, the buffers 38 and 42 may be implemented within the memory 72 and 88, respectively.

Figure 2:
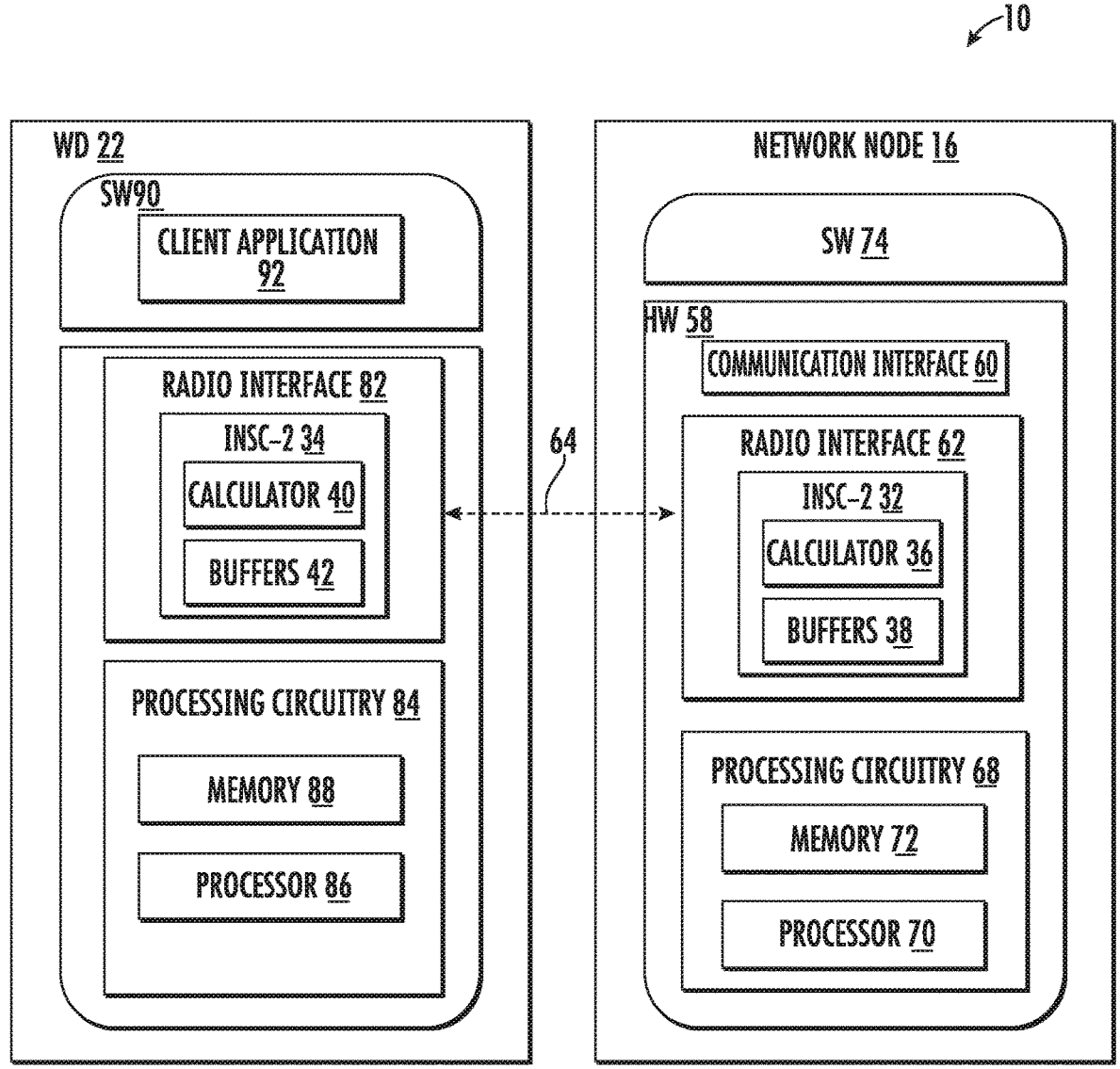
FIG. 2 is a block diagram of a network node and a wireless device constructed according with principles set forth herein.

In some embodiments, the inner workings of the network node 16 and WD 22 may be as shown in FIG. 2 and independently, the surrounding network topology may be that of FIG. 1.

The wireless connection 64 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc.

Figure 3:
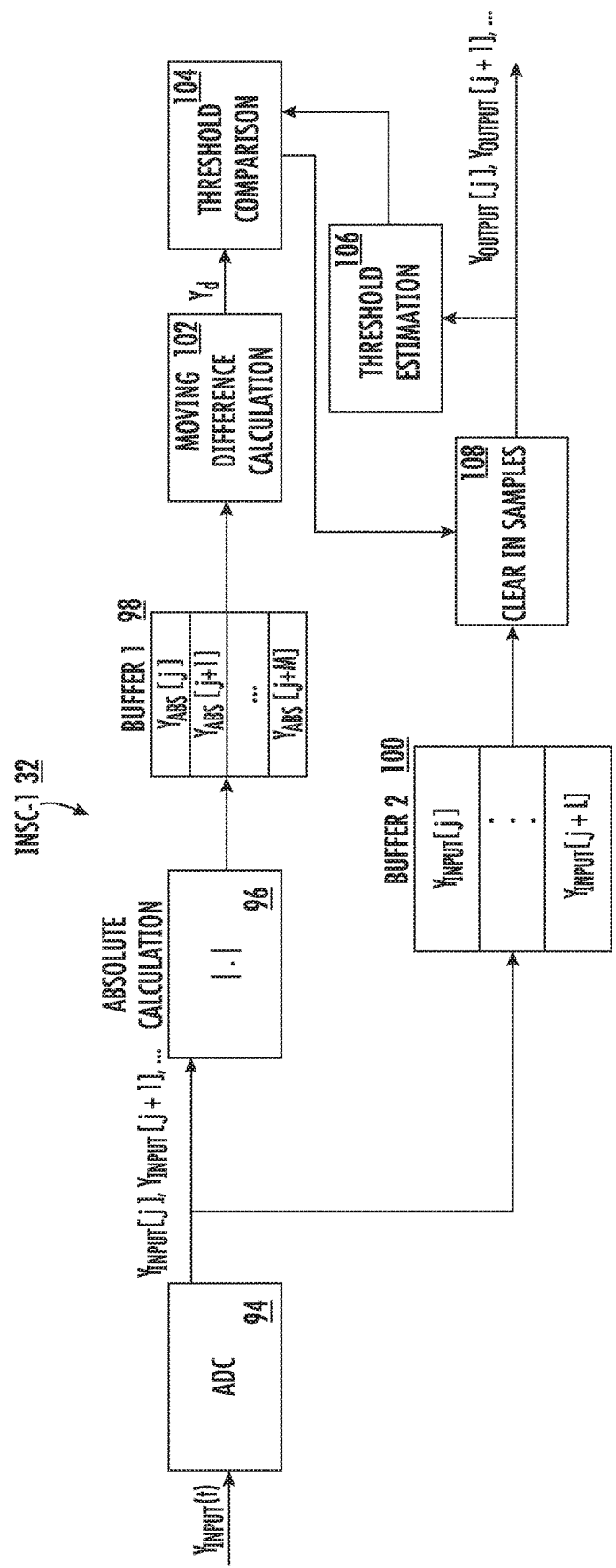
FIG. 3 is a block diagram of an impulsive noise suppression circuit (INSC) constructed according to principles set forth herein.

FIG. 3 is a block diagram of an example of the INSC-1 32. The operation of the INSC-2 34 is as described with respect to the INSC-1 32. The INSC-1 32 includes an analog to digital converter (ADC) 94 which converts a signal received by the radio interface 62 from an analog signal that changes continuously over time to a sequence of digital samples of finite width and different amplitudes that roughly follow the amplitude of the analog signal. An absolute value calculator 96 estimates the absolute values of the complex samples from the ADC 94 and outputs the absolute values to a first buffer 98. Each sample added to the first buffer 98 overwrites an existing sample stored in the first buffer 98. N absolute values are stored in the first buffer 98, where N is an integer greater than 1. The samples that are output by the ADC 94 are also added to a second buffer 100. The second buffer 100 stores L samples where L is an integer multiple of N. For example, L could be equal to 2N in some embodiments. In some embodiments, the size of the first and/or second buffers may be selected as the INSC-1 32 operates or preselected and fixed during operation of the INSC-1 32.

Returning to the first buffer 98, a moving difference calculator 102 calculates the absolute values of the differences between the amplitude of samples stored in the first buffer 98. The output of the moving difference calculator 102 is input to a threshold comparator 104, which compares the output of the moving difference calculator 102 to a threshold that is estimated by a threshold estimator 106. When the output of the moving difference calculator 102 exceeds the threshold, the threshold comparator 104 causes samples from the second buffer 100 to be cleared (set to a low value such as zero) in Clear IN samples block 108. Otherwise, Clear IN samples block 108 outputs the samples received from the second buffer 100. The output of the Clear IN samples block 108 is a sequence of samples that have the impulse noise substantially suppressed. This sequence is output to a baseband processor which further processes the IN-suppressed sequence of samples. The output of the Clear IN samples block 108 is also input to the threshold estimator 106 adaptively determines the threshold compared in the threshold comparator 104 to the output of the moving difference calculator 102.

The absolute value calculator 96, the moving difference calculator 102, the threshold comparator 104, the threshold estimator 106 and the Clear IN samples block 108 may all be part of the calculator 36. The first and second buffers 98 and 100, respectively, can be implemented as the buffers 38. The steps performed by these blocks may be performed only when impulsive noise (IN) detection is enabled, in some embodiments. For example, IN detection may be enabled in response to a received signal power exceeding a signal power threshold. The signal power threshold may be a receiver dependent parameter that is calculated for AGC functionality. When the received signal power exceeds the signal power threshold, the ratio of IN to received signal power (INSR), may be low and the IN may be difficult to detect. In this input is treated as another AWGN sample. This may save processing resources when INSR is too low. In case a glitch is detected, i.e., a noise spike is detected, the INSC-1 32 may perform the following-described steps when triggered by an AGC event. This further saves processing resources when an AGC event is not occurring.

In operation of the INSC-1 32, a continuous time signal $Y_{INPUT}(t)$ is first discretized by ADC 94, yielding the discrete time signal with stream of samples $Y_{INPUT}[1]$, $Y_{INPUT}[2], \ldots, Y_{INPUT}[j], Y_{INPUT}[j+1], \ldots$, etc. The received samples are complex IQ samples. The received orthogonal frequency division multiplexed (OFDM) signal (S) is well modelled as a complex Gaussian (Normal) distributed signal with zero mean and variance (power) $\sigma_s^2$, i.e., $S\sim CN(0, \sigma_s^2)$. There are two hypotheses for each received sample as follows:

$$H_0: Y_{INPUT}[j]=S[j]+W[j] \quad (1)$$

$$H_1: Y_{INPUT}[j]=S[j]+W[j]+X_{IN}[j], \quad (2)$$

where $H_0$ denotes hypothesis 0, where the received sample is the desired OFDM sample $S[j]$ plus $W[j]$, which is the additive receiver's white Gaussian Noise (AWGN), which follows $W\sim CN(0, \sigma_w^2)$. Hence under $H_0$, $Y_{INPUT}$ follows $CN(0, \sigma_{H_0}^2)$, where $\sigma_{H_0}^2=\sigma_s^2+\sigma_w^2$. $H_1$ denotes hypothesis 1, where the received signal is the superposition of the desired OFDM signal S, the inevitable AWGN W and the IN sample $X_{IN}[j]=b_j Z_{IN}[j]$, which is modelled as a Bernoulli-Gaussian distribution. Then $X_{IN}[j]=b_j Z_{IN}[j]$, where $Z_{IN}[j]\sim CN(0, \sigma_{IN}^2)$ and $b_j$ is a Bernoulli random variable with probability mass function:

$$P(b_j) = \begin{cases} p, & b_j = 1 \\ 1-p, & b_j = 0 \end{cases} \quad (3)$$

and where p is the probability of occurrence of IN. Under $H_0$ in (1) $b_j=0$ with probability $1-p$ and hence $X_{IN}[j]=0$ and under $H_1$ in (2) $b_j=1$ with probability p. IN to noise ratio (INR) is defined as $$INR = \frac{\sigma_{IN}^2}{\sigma_w^2},$$

which is usually very high on the order of 40 to 60 dB. The impact of IN can be seen as a reduction in the overall signal to noise ratio, which on average is given as $$SNR_a = \frac{\sigma_S^2}{(1-p)\sigma_w^2 + p(\sigma_w^2 + \sigma_{IN}^2)},$$

which will lead to an undesirable higher bit error rate (BER). Hence, the first objective is to decide to which hypothesis the received sample belongs.

The received sample is a complex IQ sample $Y_{INPUT}[j]=Y_I[j]+i*Y_Q[j]$, where $i=\sqrt{-1}$. The absolute value of each sample is calculated as $Y_{ABS}[j]=\sqrt{Y_I^2[j]+Y_Q^2[j]}$ by the absolute value calculator 96. The absolute values of the received samples are saved in a memory location, namely, first buffer 98, which has a depth of N locations, i.e., it can save up to N absolute values, where $N=M+1$. M is a design parameter that depends on the application.

Figure 4:
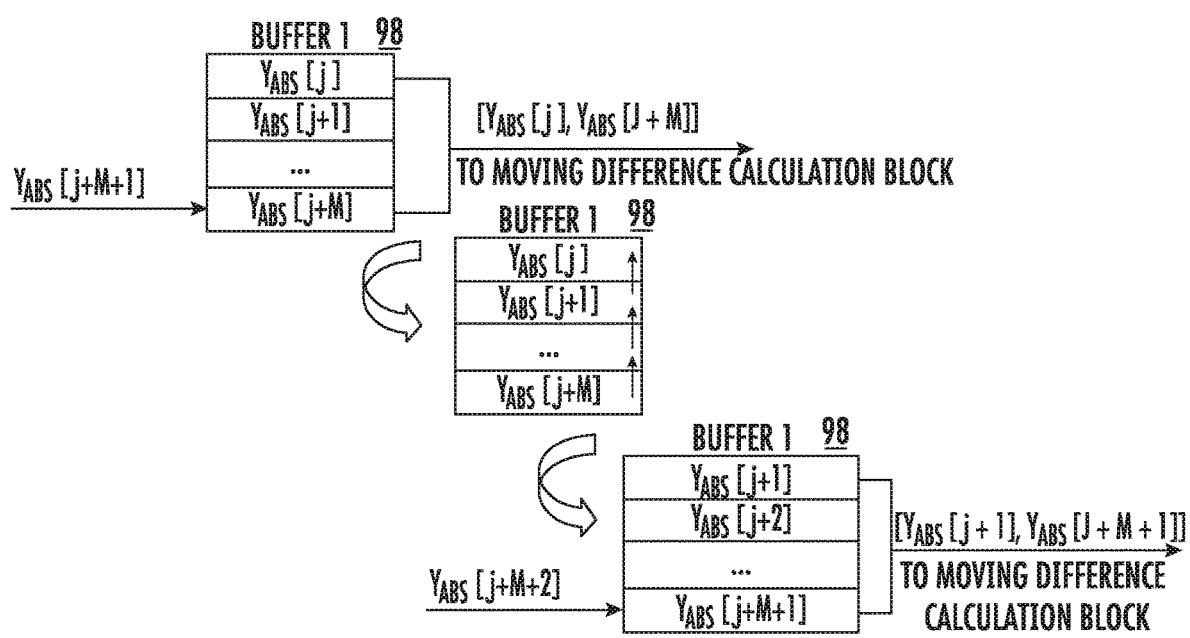
FIG. 4 is a diagram illustrating buffer operation according to principles set forth herein.
Figure 5:
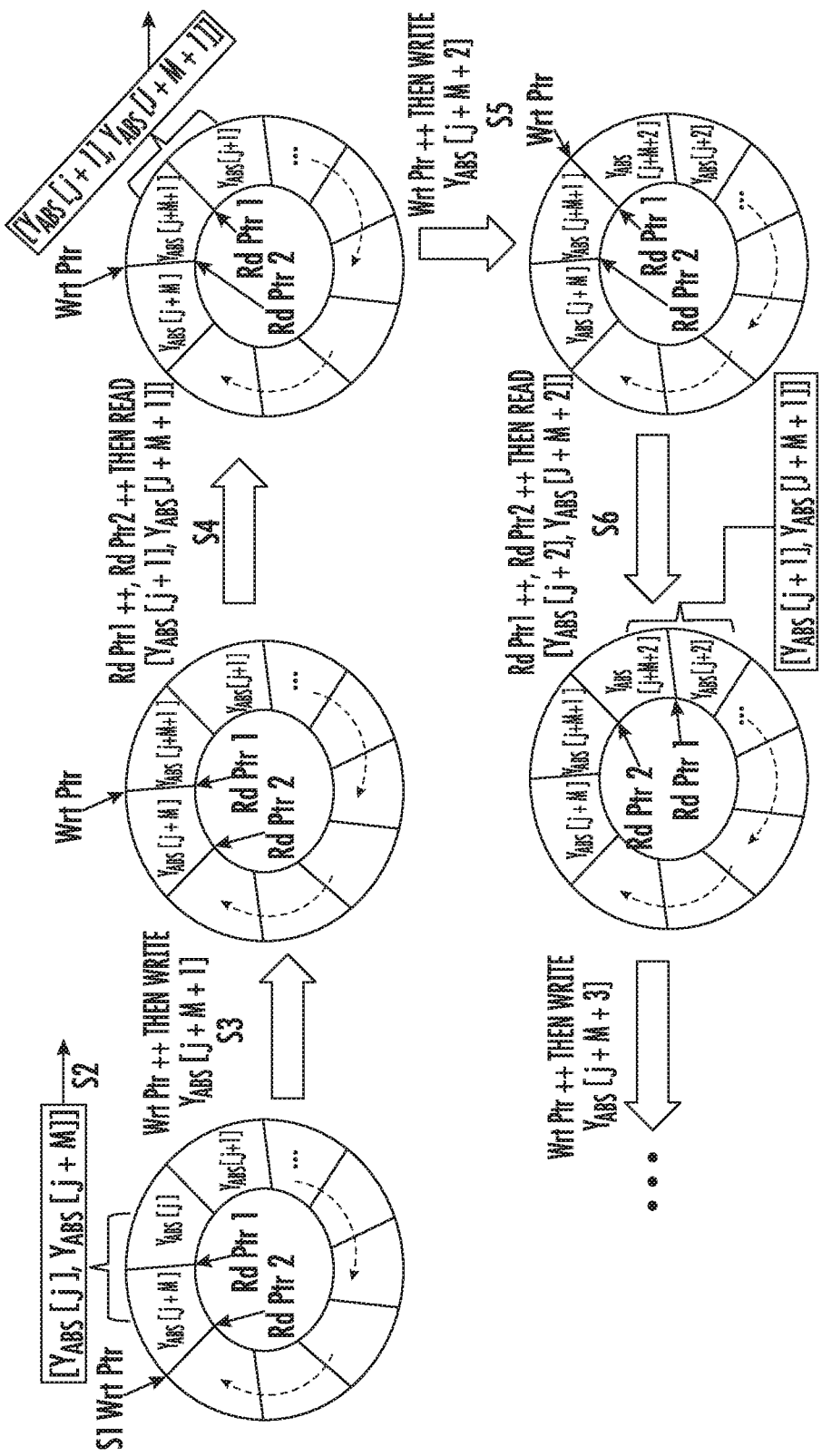
FIG. 5 is a diagram of a cyclical buffer operating according to principles set forth herein.

The moving difference calculated by the moving difference calculator 102 is calculated between two absolute values saved in the first buffer 98 taken at steps of M from the stream of received samples. One mechanism for handling samples taken from the first buffer 98 is illustrated in FIG. 4. In the first buffer 98, $M+1$ (for example, from $Y_{INPUT}[j]$ to $Y_{INPUT}[j+M]$) received absolute values are saved. Two values at a step of M are fed from the first buffer 98 to the moving difference calculator 102. The saved values are then copied over to the next memory location in the first buffer 98. New sample $Y_{ABS}[j+M+1]$ then overwrites $Y_{ABS}[j+M]$ and so on. A second mechanism for handling samples taken from the first buffer 98 is illustrated in FIG. 5 that uses cyclic shifting. Steps for this second mechanism are as follows:

S1. Samples $Y_{ABS}[j]$ to $Y_{ABS}[j+M]$ are written in the memory location of the first buffer 98 using a pointer denoted as Wrt Ptr.

S2. Two samples $[Y_{ABS}[j], Y_{ABS}[j+M]]$ are read from the first buffer 98 using two read pointers denoted as Rd Ptr1 and Rd Ptr2.

S3. Wrt Ptr is incremented and a new sample $Y_{ABS}[j+M+1]$ is then written in the memory location of $Y_{ABS}[j]$.

S4. Rd Ptr1 and Rd Ptr2 are both incremented and two samples $[Y_{ABS}[j+1], Y_{ABS}[j+M+1]]$ are read out.

S5. Wrt Ptr is incremented and a new sample $Y_{ABS}[j+M+2]$ is then written in the memory location of $Y_{ABS}[j+1]$.

S6. Rd Ptr1 and Rd Ptr2 are both incremented and two samples $[Y_{ABS}[j+2], Y_{ABS}[j+M+2]]$ are read out.

S7. And so on.

For a sample j in the stream of received samples, the moving difference calculator 102 reads the selected two values from the memory location of the first buffer 98 where absolute values are saved, and calculates the moving difference according to:

$$Y_d[j]=|Y_{ABS}[j+M]-Y_{ABS}[j]| \quad (4)$$

When IN samples occur in a sparse nature, i.e., one sample every $N_{samp}$ samples, $M=1$ and $Y_d[j]$ represents the difference between the absolute value of each two consecutive samples as:

$$Y_d[j]=|Y_{ABS}[j+1]-Y_{ABS}[j]| \quad (5)$$

When locating a glitch that occurs, for example, due to setting or releasing an analog attenuator, M can be >1, since the glitch exponentially increases and decreases within a very short period of time. Hence, by analyzing the glitch for the analog attenuator, the value of M can be adjusted accordingly. M can be selected as the number of samples the glitch takes to reach its peak and hence the length of the glitch is 2M. An example of $Y_d[j]$, when $M=4$ is:

$$Y_d[1]=|Y_{ABS}[5]-Y_{ABS}[1]|$$

$$Y_d[2]=|Y_{ABS}[6]-Y_{ABS}[2]|$$

$$Y_d[3]=|Y_{ABS}[7]-Y_{ABS}[3]|. \quad (6)$$

The value of the threshold TH used in the threshold comparator 104 may be calculated by the threshold estimator 106 in real-time in an adaptive way by continuously monitoring the change of the power of the received signal presented in equation (1) above under hypothesis $H_0$. A goal may be to continuously adjust the threshold based on the power of the received signal in the absence of IN. Hence, when the power of the received signal increases or decreases, the threshold is adjusted accordingly.

To calculate TH, the probability distribution of $Y_d$ may be modelled first. Since $Y_I$ and $Y_Q$ both follow $$\sim \mathcal{N}\left(0, \frac{\sigma_{H_0}^2}{2}\right),$$

$Y_{ABS}$ follows a Rayleigh distribution with a scale parameter $$\frac{\sigma_{H_0}}{\sqrt{2}}.$$

The cumulative distribution function (CDF), which measure the probability that $Y_{ABS} \leq TH$ is:

$$F_{Y_{ABS}}(TH) = Pr\{Y_{ABS} \leq TH\} = 1 - e^{\frac{TH^2}{\sigma_{H_0}^2}} \quad (7)$$

One way to estimate the threshold TH is first to define the probability distribution of the moving difference in equation (4). This is the probability distribution of the absolute value of the difference between two Rayleigh distributed random variables (their CDF is presented in equation (7)). Once this is defined, TH is calculated by setting the CDF to a fixed preset value. This will result in a complicated formula that will require extensive computational complexity to be solved, particularly in real-time. Rather, a much more implementable way to estimate the TH, which also takes into consideration the distribution of $Y_{ABS}$ in equation (4) is as follows:

1. Under hypothesis $H_0$, the variance of each Rayleigh random variable in the right-hand side of equation (4) is $$\frac{4-\pi}{4}\sigma_{H_0}^2.$$

Hypothesis $H_0$ is used since the variance of IN is unknown. However, the variance (power) of the received signal under $H_0$ can be estimated.

2. The variance of the difference between the two Rayleigh distributed random variables in equation (4) is then $$2 \times \frac{4-\pi}{4}\sigma_{H_0}^2 = \frac{4-\pi}{2}\sigma_{H_0}^2.$$

3. The threshold is then calculated as a factor of the standard deviation (STDN (which is the square root of the variance)) of the distribution of difference between two Rayleigh distributed random variables according to:

$$STDN = \sqrt{\frac{4-\pi}{2}\sigma_{H_0}^2} \quad (8)$$

$$STDN = 0.6551\sigma_{H_0} \quad (9)$$

$$TH = fac \times STDN \quad (10)$$

Figure 6:
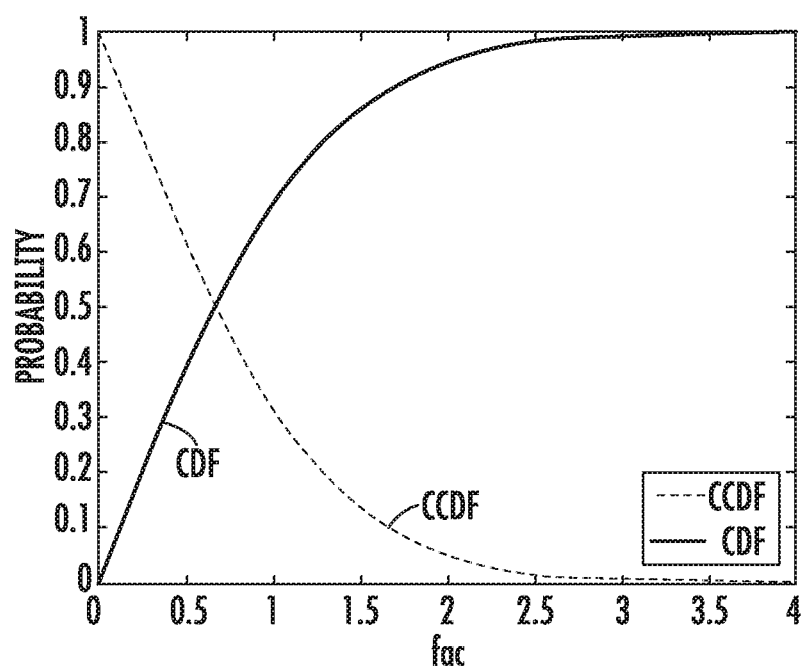
FIG. 6 is a graph of a cumulative distribution function (CDF) and 1 minus the CDF.

4. The objective now is to find TH as a factor of STDN such that when $Y_d[j] > TH$, the probability that this sample belongs to IN is maximized. In other words, the probability of false alarm, i.e., the probability that the sample belongs to the desired signal when $Y_d[j] > TH$ is minimized. In FIG. 6, a plot of both CDF and complimentary CDF (CCDF=1−CDF) of $Y_d$ versus a range of fac are presented for a 16-QAM OFDM received signal under hypothesis $H_0$ when SNR=20 dB. To calculate CCDF, the probability that $Y_d$ is greater than the threshold is calculated using (10) for every value of fac in the simulated range. As shown in FIG. 6, the probability $Pr\{Y_d[j] > TH\} \approx 0$, when fac≈3.5 or higher, i.e. TH=3.5×STDN. This implies that under $H_0$, $Y_d$ (of the desired signal) should fall under this calculated TH with highest probability. Then, when the method is implemented and $Y_d[j] > TH$, hypothesis $H_1$ (with maximized probability) is decided and a hence a decision that this sample belongs to IN is made and IN is detected.

5. The variance (power) of the received signal is continuously measured, then STDN in equation (9) is calculated accordingly. Then the adaptive threshold TH in equation (10) is then calculated.

6. TH is calculated under $H_0$ and hence, the outputted cleared value always feed the threshold estimator 106. A first order simple infinite impulse response filter (IIR) can be used to adjust the threshold $P_{avg}[j] = \beta P_{avg}[j] + (1-\beta)P_{avg}[j-1]$, where $\beta$ is a design parameter. Another method is to save K samples fed from the outputted stream in a first input first output (FIFO) buffer inside the threshold estimator 106 and their average power may then be calculated iteratively.

The calculated output $Y_d[j]$ of the moving difference calculator 102 is provided to the threshold comparator 104 to be compared to a threshold TH that is provided from the threshold estimator 106. At system startup, TH can be calculated based on average received signal power or measured power from an analog power detector or digital power detector used, for example, in other radio blocks such as a signal to noise ratio (SNR) estimation block. In case received signal power is not available at system startup, the threshold comparator 104 may be disabled until TH is calculated. The moving difference calculations are calculated in real-time as per each two samples received from the memory location from the first buffer 98 and hence, the threshold comparison is also applied in real-time.

When $Y_d[j] > TH$, this implies that the sample belongs to IN. However, there is a possibility that $Y_d[j] > TH$ is due to an increase in the received signal power. Therefore, for example, for M=1

1. If sample j belongs to the desired signal (but with higher power), the following samples will also have high power and hence their moving difference values will be small:

$Y_d[j-1] = |Y_{ABS}[j] - Y_{ABS}[j-1]| > TH$, but $Y_d[j] = |Y_{ABS}[j+1] - Y_{ABS}[j]| < TH$ 2. If sample j belongs to IN, due to the sparsity and impulsiveness of IN, then:

$Y_d[j-1] = |Y_{ABS}[j] - Y_{ABS}[j-1]| > TH$ $Y_d[j] = |Y_{ABS}[j+1] - Y_{ABS}[j]| > TH$

Therefore, the threshold comparator 104 declares that a sample j belongs to IN if $Y_d$ is greater than the precalculated threshold at two indices j−1 and j. In case of a glitch that starts at index j, which has a nature of rapidly increasing until the peak is reached then rapidly decreasing, M can be selected > 1 and hence, $Y_d > TH$ starting from (j−M) to (j+$N_g$), where $N_g$ is the length of the glitch. Once this is declared, the threshold comparator 104 triggers the Clear IN Sample Block 108 with the index j. In case of a glitch, if the glitch length ($N_g$) is known, then [j:j+$N_g$] indices are cleared or set to a low value such as zero in the Clear IN Samples Block 108.

This Clear IN samples block 108 outputs the saved samples in the second buffer 100 as is, unless triggered with IN indices from the threshold comparator 104.

When the Clear IN samples block 108 is triggered with the IN indices from the threshold comparator 104, the sample(s) with the provided indices are replaced with zero in the output stream of samples $Y_{output}$. $Y_{output}$ is also fed in real time to the threshold estimator 106 to adjust the calculated threshold. A flow chart for the example of M=1, which can be used for sparse IN detection is presented in FIG. 7. A flow chart of glitch detection when M>1 is presented in FIG. 8.

Figure 7:
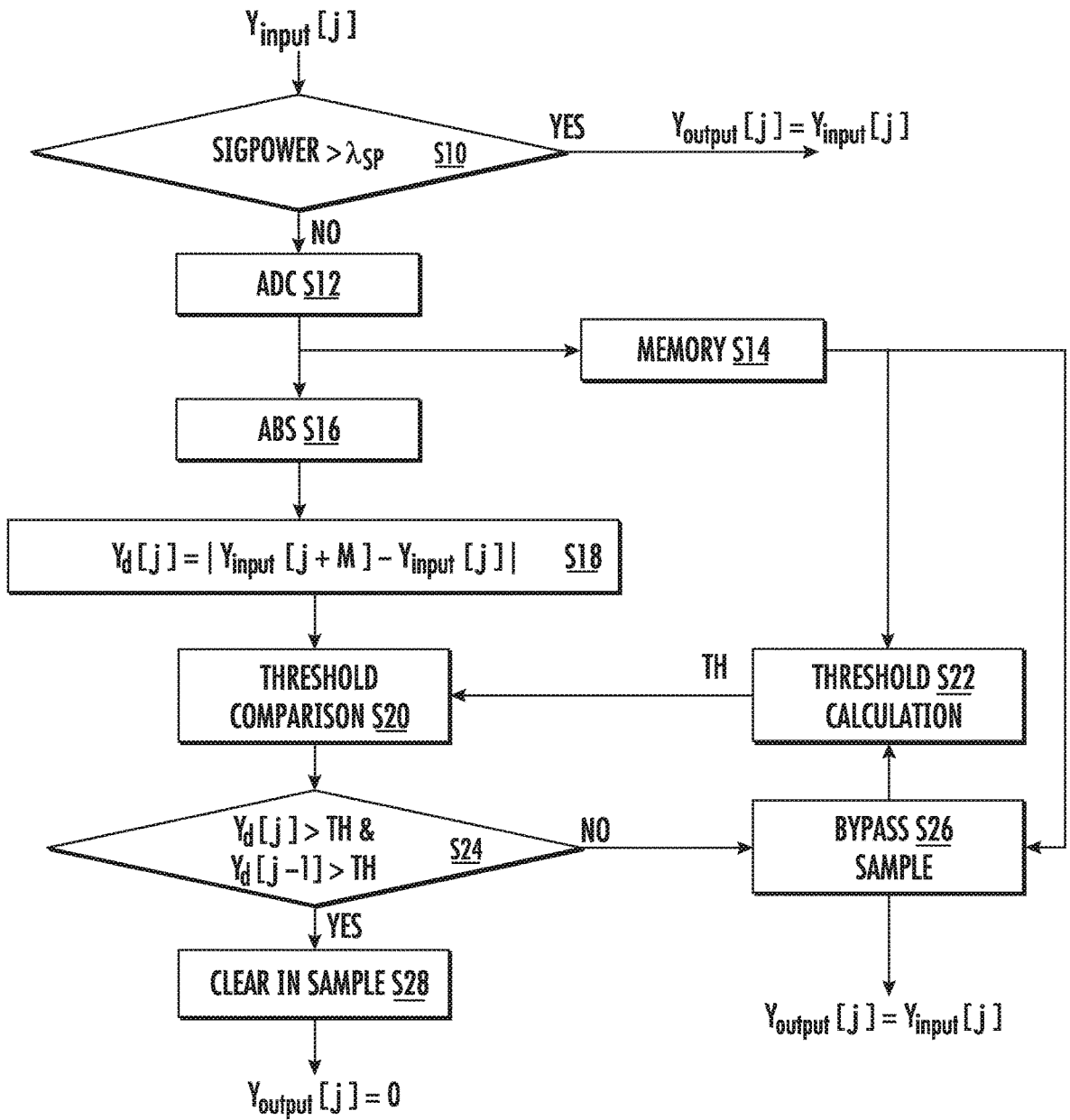
FIG. 7, is a flowchart of an exemplary process for sparse impulsive noise (IN) detection.

In FIG. 7, the received signal power is compared to a signal power threshold (Block S10). If the received signal power is greater than the signal power threshold, the output of the INSC-1 32 is the received signal power. Otherwise, the ADC 94 outputs a stream of received power samples (Block S12). The received power samples are sent to the second buffer 100 (Block S14) and to the absolute value calculator 96 (Block S16). A moving difference calculation on two successive samples is performed by the moving difference calculator 102 (Block S18). The output of the moving difference calculator 102 is compared to a threshold (Block S20). The threshold is calculated by the threshold estimator 106 (Block S22). Block S24 shows that if either of two successive samples of the output of the moving difference calculator 102 do not exceed the threshold, then at least one of the two successive samples is bypassed (output without being cleared) (Block S26). If both of the two successive samples exceed the threshold, then at least one of the two successive samples is cleared (Block S28).

Figure 8:
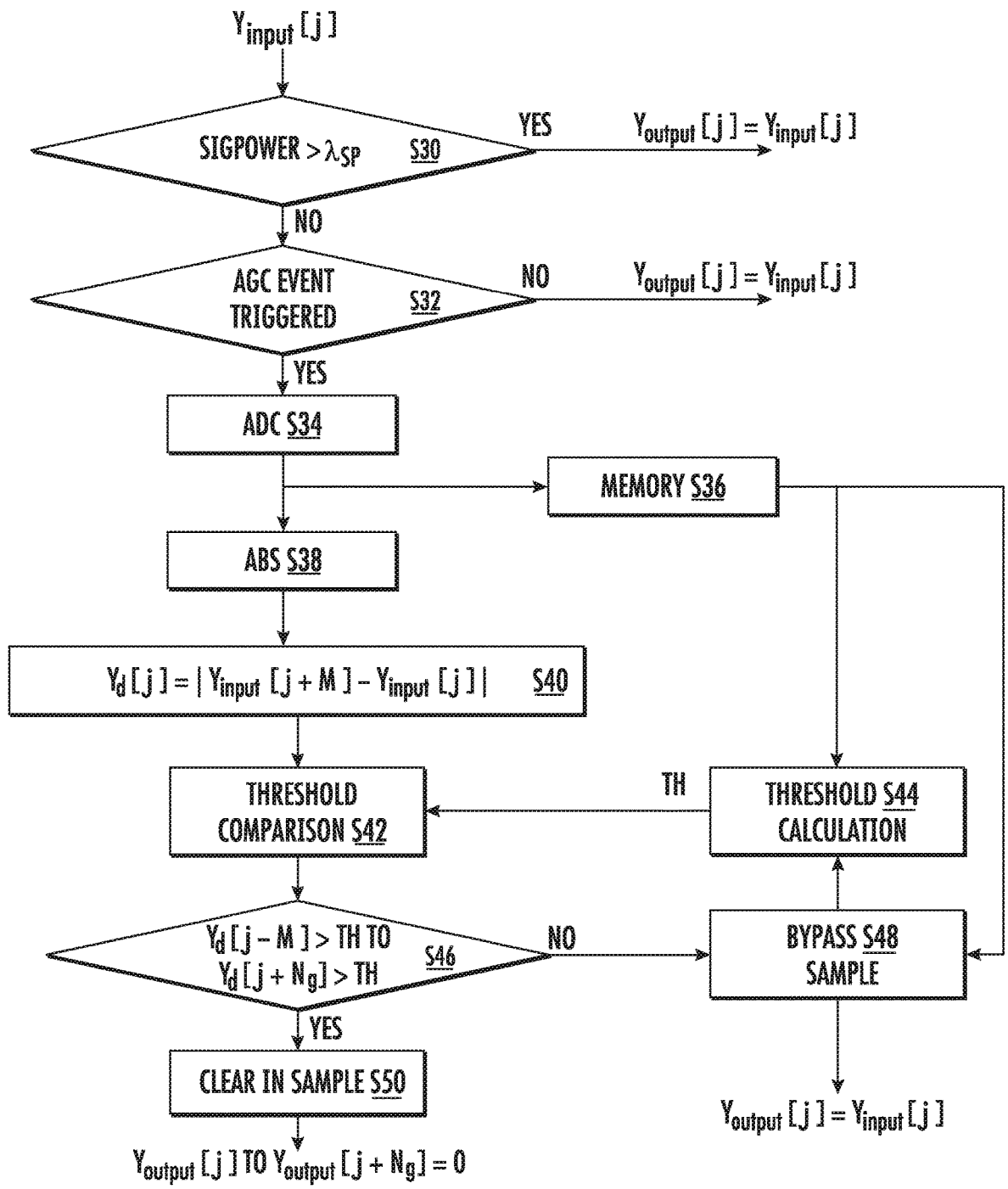
FIG. 8 is a flowchart of an exemplary process for glitch detection.

In FIG. 8, the received signal power is compared to a signal power threshold (Block S30). If the received signal power is greater than the signal power threshold, the output of the INSC-1 32 is the received signal power. Otherwise, if an AGC event is not triggered (Block S32), the output of the INSC-1 32 is the received signal power. If the AGC event is triggered (Block S32), then the received signal is sampled by the ADC 94 (Block S134). The output samples from the ADC 94 are stored in the second buffer 100 (Block S36) and sent to the absolute value calculator 96 (Block S38). A moving difference calculation on M successive samples is performed by the moving difference calculator 102 (Block S40). Each output of the moving difference calculator 102 over a range of M samples is compared to a threshold (Block S42). The threshold is calculated by the threshold estimator 106 (Block S44). Block S46 shows that if any of the samples in a range of Ng samples that are output by the moving difference calculator 102 do not exceed the threshold, then at least one of the successive samples is bypassed (output without being cleared) (Block S48). If all of the successive samples in the range of Ng samples exceed the threshold, all of the successive samples in the range of Ng samples are cleared (Block S50).

Thus, some embodiments allow for detection and mitigation of impulsive noise (IN), which leads to significant improvements in the performance of the receiver over known methods of noise suppression. Some embodiments may provide one or more of the following advantages:
1. IN can be caused due to multiple access interference, which makes some embodiments applicable to a wide range of communication systems where multiple access interference is an issue.
2. Out of sync TDD communication can lead to IN, which makes some embodiments also applicable in such scenarios.
3. Glitches caused when adjusting analog attenuators (which are used in all radios to adjust input power) can be detected and mitigated using some embodiments described herein.
4. IN is probable to occur in indoor environment where electrical machinery is used such as industrial (factory) environment, which makes some embodiments applicable to indoor radios and communication systems.
5. IN is one main issue of powerline communication, and hence this is another venue where some embodiments described herein can be applied.
6. Some embodiments can be applied on systems employing Orthogonal frequency division multiplexing (OFDM) and other systems employing for example ultra-wideband (UWB) transmission.
7. Some embodiments do not require factory calibration, prior information about the transmitted signal, channel estimation, nor a reference signal to detect the presence of IN.
8. Some embodiments have low implementation costs and low computational complexity.
9. In some embodiments, the threshold is adjusted adaptively in real-time. Therefore, the INSC-1 32 can better detect the presence of IN.
10. Some embodiments, have as a design parameter, adjusting a step size of the moving difference calculation according to the nature of IN.
11. Some INSCs described herein may be integrated with current radio receiver circuitry as part of AGC functionality, which can be shared. Or, an INSC can be incorporated into the radio as a standalone design.
12. Some embodiments improve performance by reducing the BER.

Figure 9:
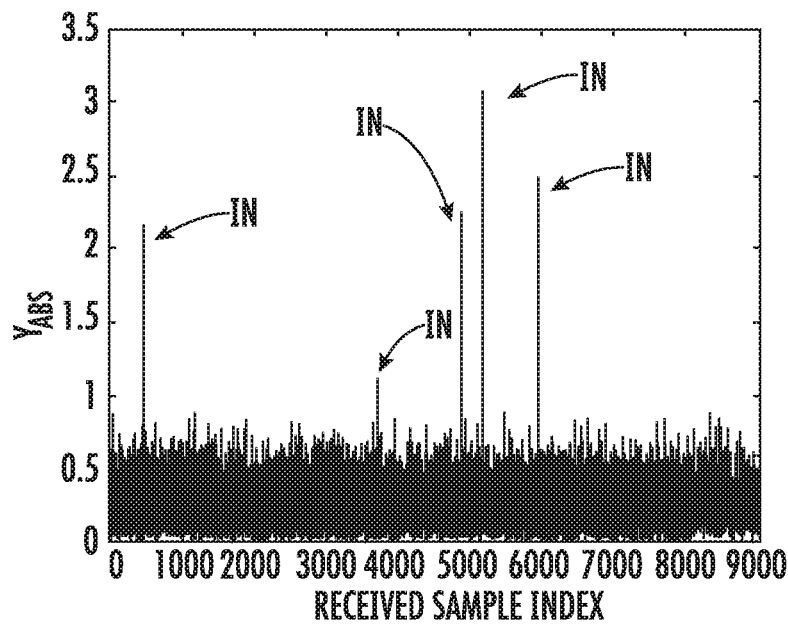

FIG. 9 shows the absolute value of a 16 quadrature amplitude modulation (QAM) OFDM received signal in the presence of IN, for INR=40 dB, SNR=20 dB and a probability of occurrence of IN $p=10^{-3}$. A probability of $p=10^{-3}$ implies an average of one IN sample per 1000 received samples. The number of Fast Fourier Transform (FFT) points in the representation of FIG. 9, which equates to the number of subcarriers per OFDM symbol), is 1024. The number of cyclic prefix samples per OFDM symbol for FIG. 9 is 128, and the number of simulated OFDM symbols is 7.

Figure 10:
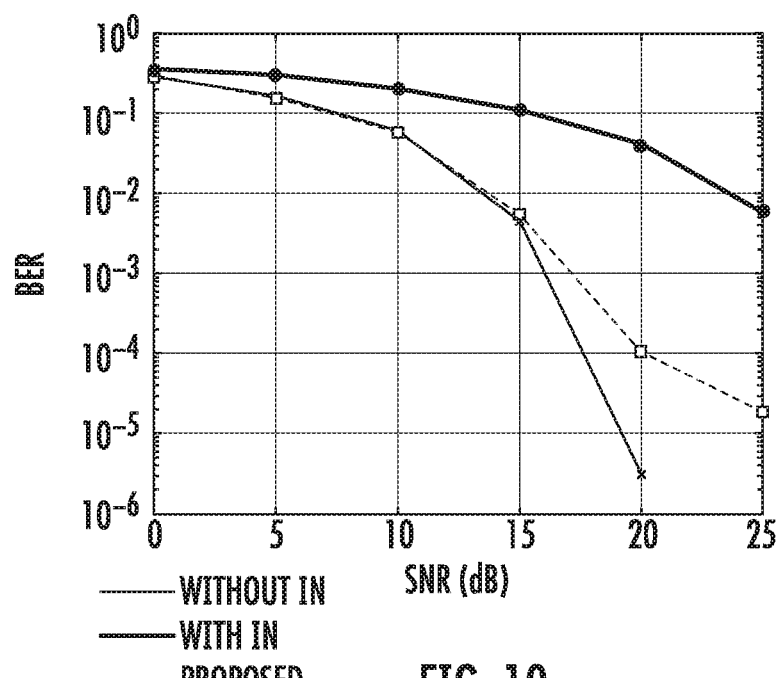
FIG. 10 is a graph of BER versus SNR without impulsive noise, with impulsive noise and with impulsive noise suppression according to embodiments described herein for 16 QAM and INR=40 dB.
Figure 11:
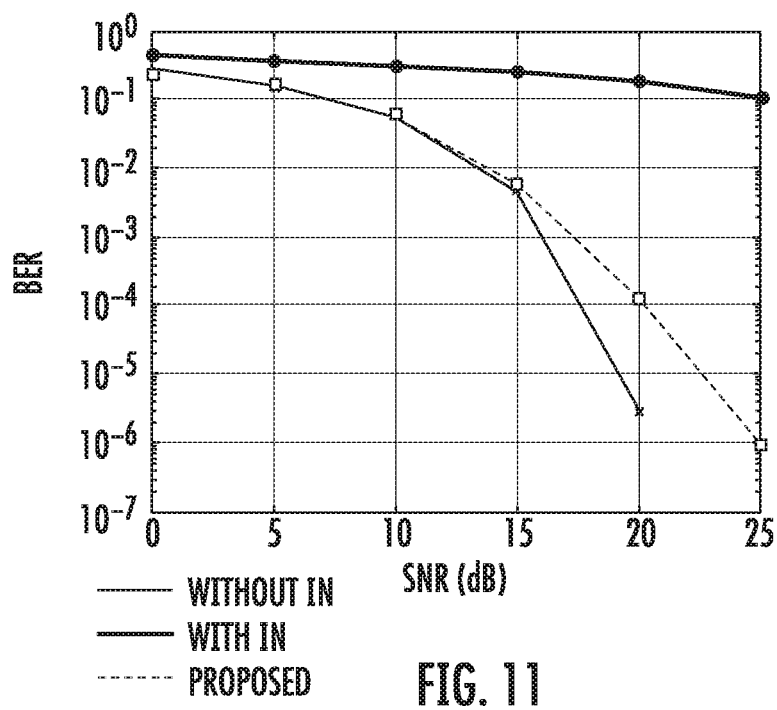
FIG. 11 is a graph of BER versus SNR without impulsive noise, with impulsive noise and with impulsive noise suppression according to embodiments described herein for 16 QAM and INR=50 dB.
Figure 12:
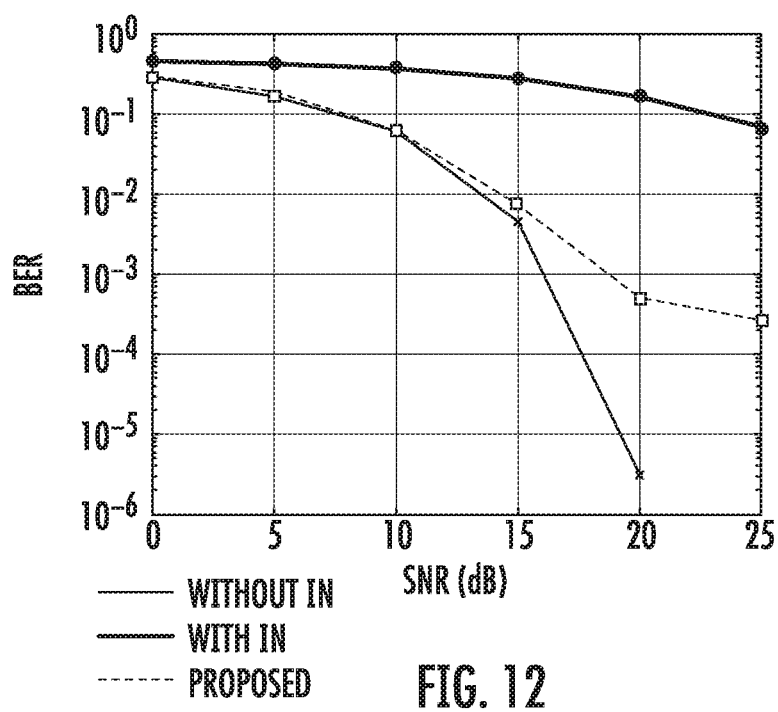
FIG. 12 is a graph of BER versus SNR without impulsive noise, with impulsive noise and with impulsive noise suppression according to embodiments described herein for 16 QAM and INR=40 dB at a higher probability than for the graphs of FIG. 10.

To evaluate the impact of IN on the performance of the receiver, a BER vs SNR metric was employed. The BER was calculated though a Monte Carlo simulation using 1000 iterations of randomly generated AWGN and randomly generated IN that follow Bernoulli-Gaussian distribution. The location of IN samples changes randomly from one iteration to the next. Since IN is sparse single samples, the selected M value is 1. The BER is calculated for three cases: without IN, which presents the optimum case, with IN and with the method of detection and mitigation of IN described herein with respect to INSC-1 32. FIG. 10 and FIG. 11 present BER vs. SNR for the three cases for 16-QAM OFDM signal when $p=10^{-3}$ and INR=40 dB, and 50 dB, respectively. As shown, the method of noise suppression presented herein significantly reduces the BER by orders of magnitude when compared to the IN case. Moreover, results close to optimum are achieved, particularly for SNR<15 dB. In FIG. 12, p increases to $3\times10^{-3}$ under the same simulation settings with INR=40 dB. This shows significant improvement in BER when compared to the case of BER with IN.

Figure 13:
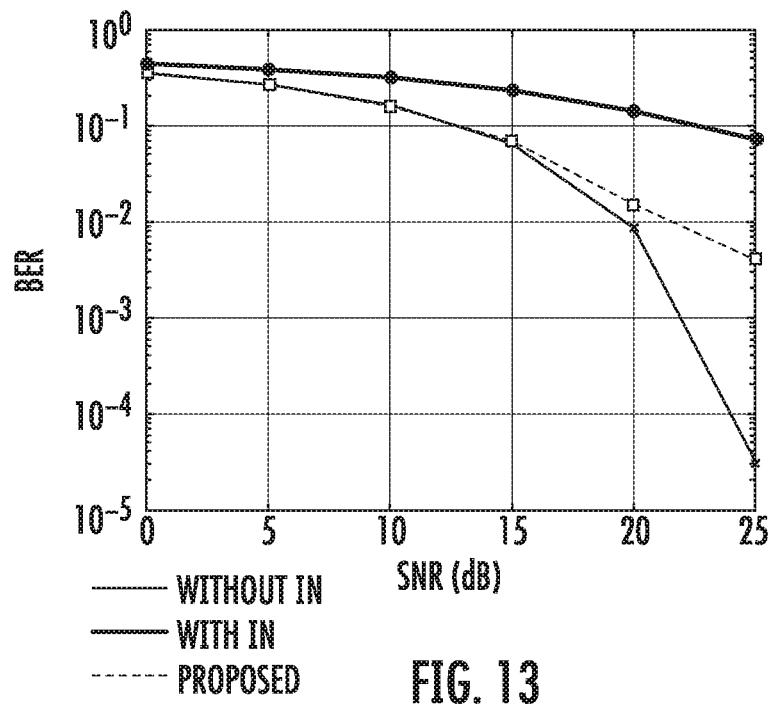
FIG. 13 is a graph of BER versus SNR without impulsive noise, with impulsive noise and with impulsive noise suppression according to embodiments described herein for 64 QAM and INR=40 dB.
Figure 14:
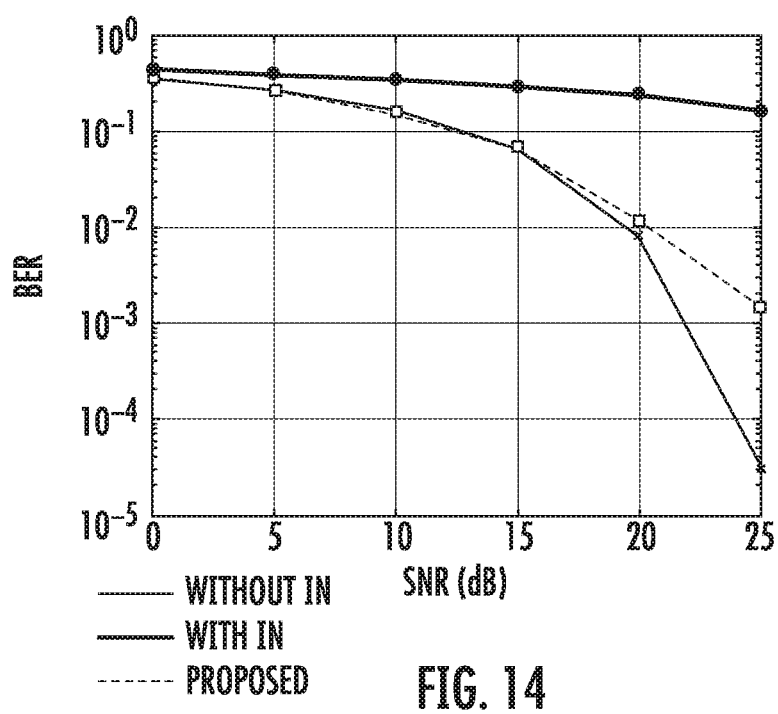
FIG. 14 is a graph of BER versus SNR without impulsive noise, with impulsive noise and with impulsive noise suppression according to embodiments described herein for 64 QAM and INR=50 dB.

FIG. 13 and FIG. 14 present BER vs. SNR for the three cases for 64-QAM OFDM signal when $p=10^{-3}$ and INR=40 dB, and 50 dB, respectively. As expected, 64-QAM modulation requires higher SNR to achieve the same BER as achieved for 16-QAM. It is noted that as INR increases, the performance of the noise suppression method described herein improves.

Figure 15:
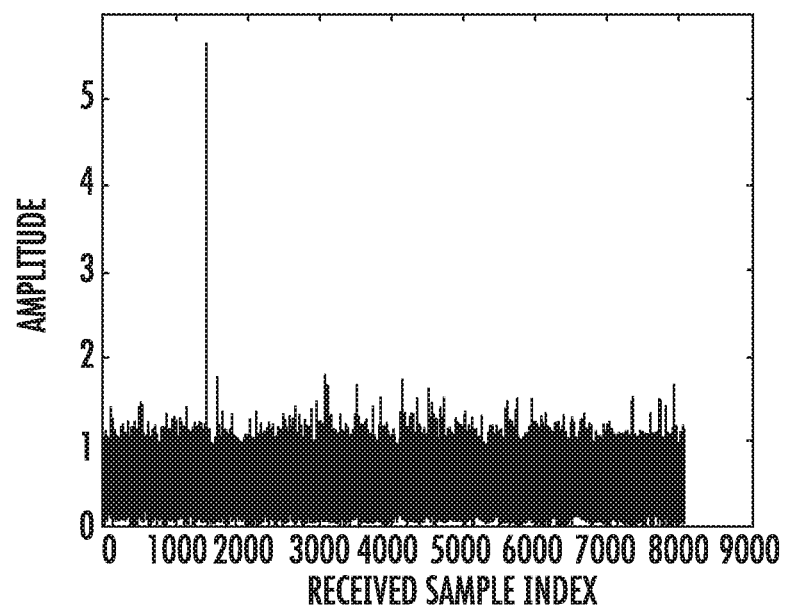
FIG. 15 is a plot of a received signal with a symmetric glitch.

A glitch caused by an attenuator in an AGC application was simulated under two scenarios; symmetric glitch and asymmetric glitch. In FIG. 15, a symmetric glitch which has a window size of Ng=21 samples is depicted in a received 16-QAM OFDM signal. The glitch to noise ratio (GNR)=35 dB and SNR=25 dB. As shown, the glitch takes a few samples to ramp up and ramp back down unlike the single sparse example presented above. When detecting a glitch, fac is adjusted higher than 3.5.

Figure 16:
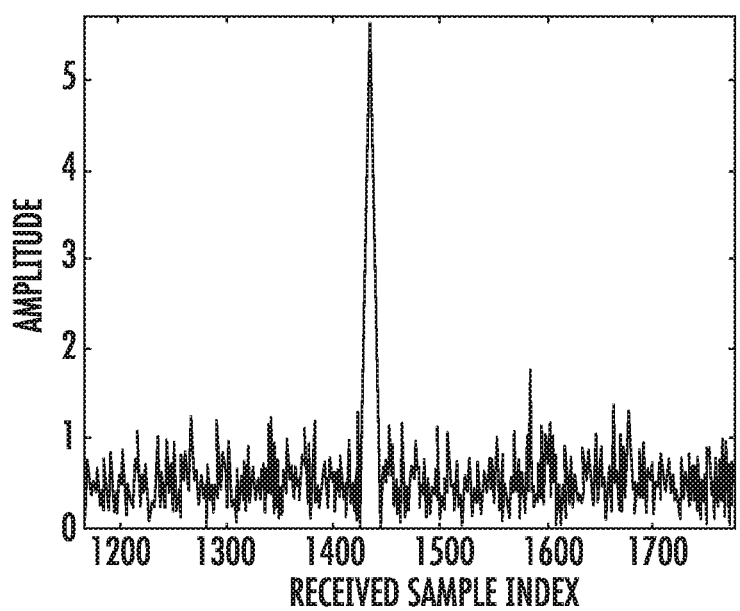
FIG. 16 is a plot of the symmetric glitch of FIG. 15 with an expanded time scale.
Figure 17:
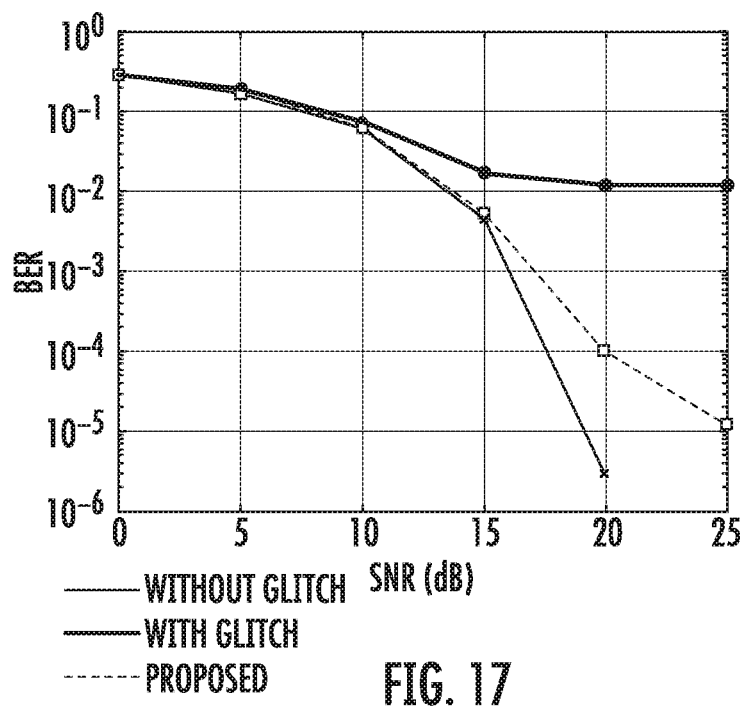
FIG. 17 is a graph of BER versus SNR without impulsive noise, with impulsive noise and with impulsive noise suppression according to embodiments described herein for a symmetric glitch with 11 samples.
Figure 18:
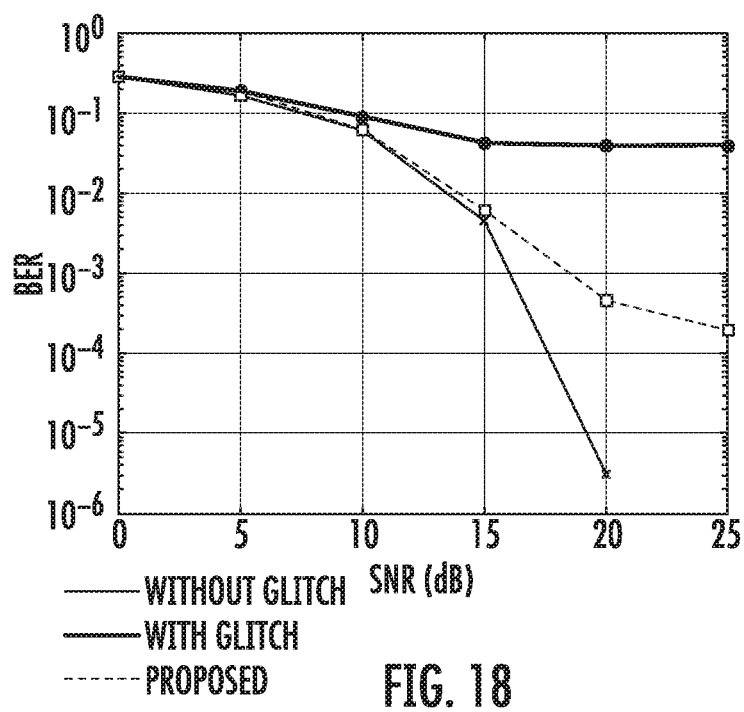
FIG. 18 is a graph of BER versus SNR without impulsive noise, with impulsive noise and with impulsive noise suppression according to embodiments described herein for a symmetric glitch with 21 samples.

In case of a glitch, it is better to choose M>1, which can be inferred from FIG. 16. To maximize the difference when calculating the moving difference and hence increasing the probability of detecting the glitch, the step size should be $$M = \text{ceil}\left(\frac{N_g}{2}\right)$$

for a symmetric glitch. FIG. 17 and FIG. 18 show the BER for the three cases in a symmetric glitch scenario versus SNR and at glitch to signal power ratio (GSR)=10 dB, for 16-QAM OFDM signal and $N_g$=11 and 21 samples, respectively. In case of a glitch that starts at sample j and have a window length $N_g$, there is a calculated vector denoted by $Y_H$, of indices that corresponds $Y_d$>TH.

Ideally, $Y_H$=[j−M: j+$N_g$−1]. When $N_g$ is known (as in the case for FIG. 17 and FIG. 18), the first value in the vector $Y_H$ is only needed to calculate the indices of the samples that are cleared. These cleared samples have the indices [$Y_H$[1]+M:$Y_H$[1]+M+$N_g$−1]. It is shown that the proposed method improves the BER significantly and achieve results close to optimum (no glitch case).

Figure 19:
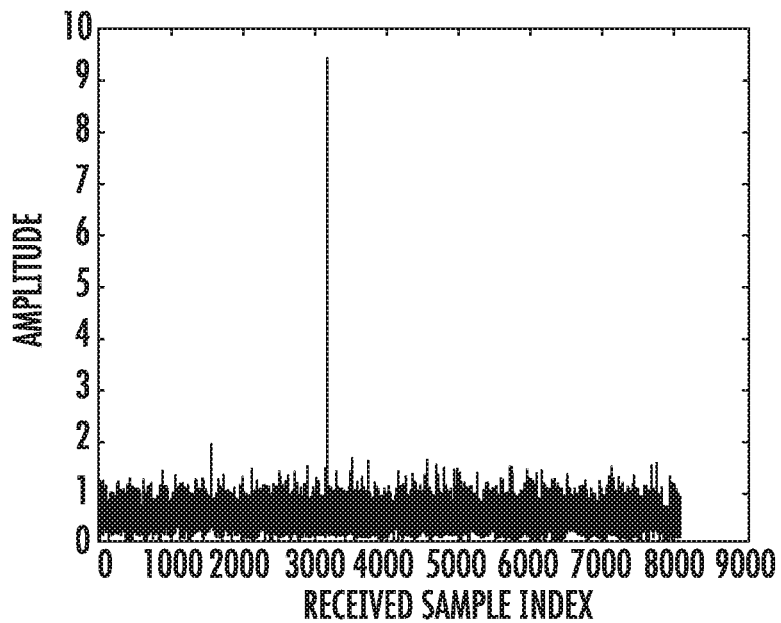
FIG. 19 is a plot of an asymmetric glitch.
Figure 20:
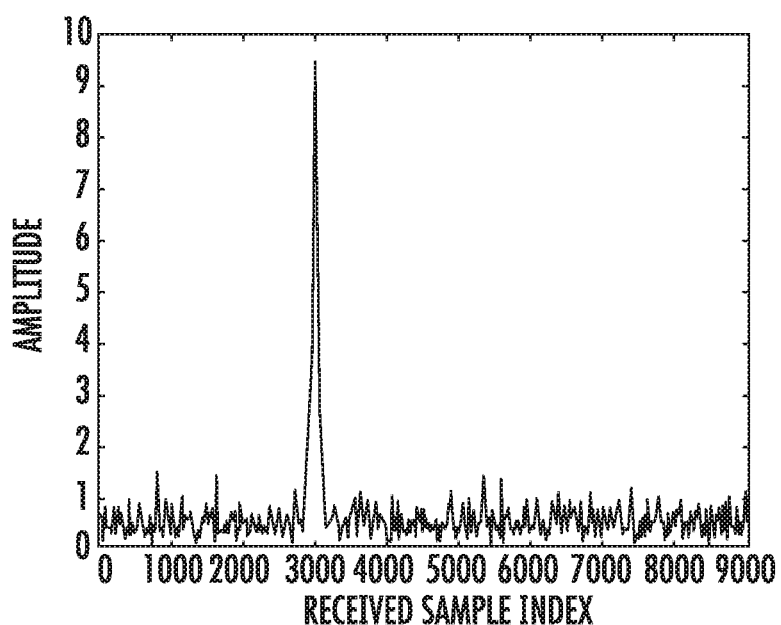
FIG. 20 is a plot of the asymmetric glitch of FIG. 19 with an expanded time scale.
Figure 21:
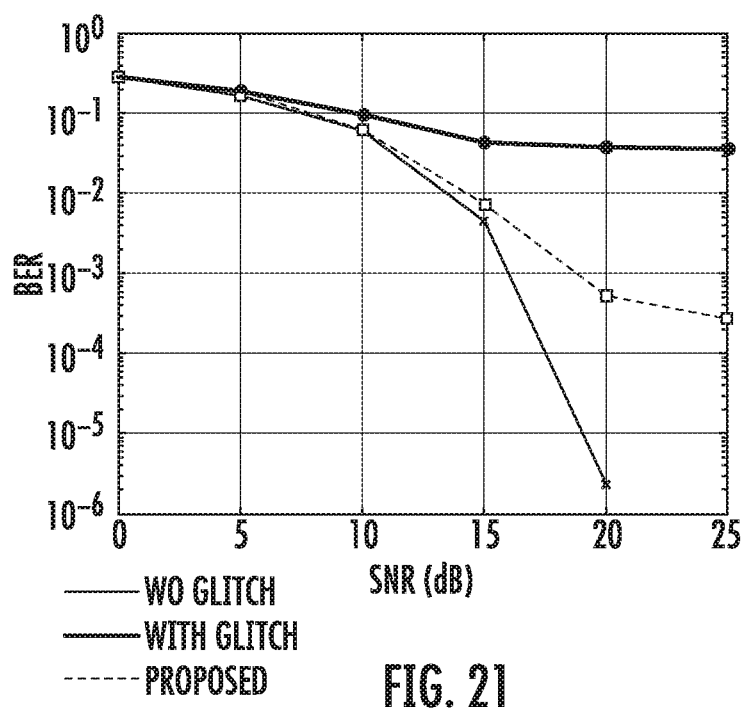
FIG. 21 is a graph of BER versus SNR without impulsive noise, with impulsive noise and with impulsive noise suppression according to embodiments described herein for an asymmetric glitch with 11 samples.
Figure 22:
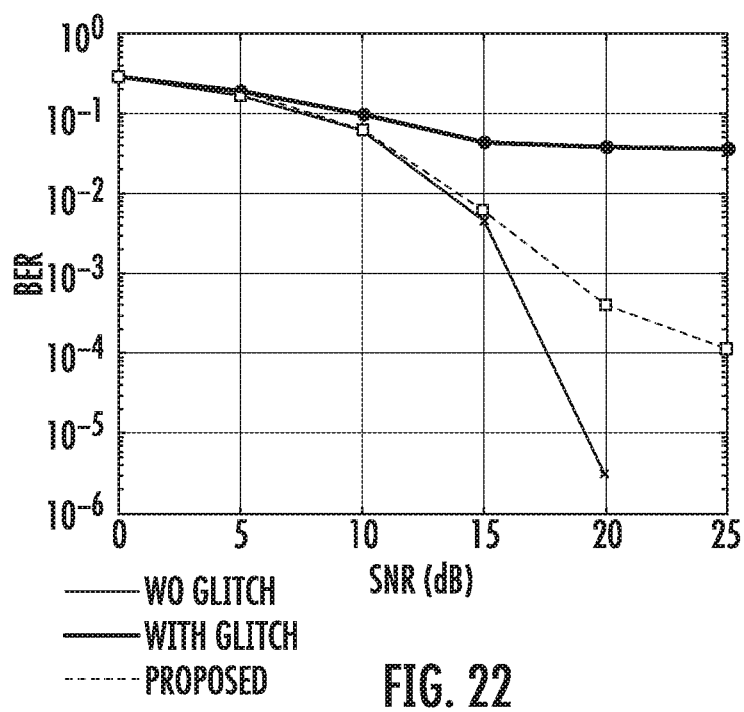
FIG. 22 is a graph of BER versus SNR without impulsive noise, with impulsive noise and with impulsive noise suppression according to embodiments described herein for an asymmetric glitch with a number samples that is not known in advance.

FIG. 19 and FIG. 20 show an asymmetric glitch which has a window size of $N_g$=11 samples. FIG. 21 shows the BER for the three cases versus SNR at GSR=10 dB in an asymmetric glitch scenario for 16-QAM OFDM signal and $N_g$=11 samples. In FIG. 21, $N_g$ is assumed to be known and the indices of the cleared samples are [$Y_H$[1]+M:$Y_H$[1]+M+$N_g$−1] as before. Note that the glitch window size, $N_g$, does not have to be known in advance. In FIG. 22 there is shown a plot of the BER for the three cases when $N_g$ is unknown and changes arbitrarily for each iteration (1000 iterations at each SNR value are used) in the range of [8:20] samples. The selected step size is M=4. The cleared IN samples have the indices [$Y_H$[1]+M:$Y_H$[end]]. At low GSRs, this vector can be adjusted around these values to achieve better performance. It is shown that the method applied as described herein improves the BER significantly.

Ultra-wide band (UWB) communication is another application of some embodiments. In UWB communication, very short pulses with very wide band are transmitted. They can coexist with other narrowband technologies, and can be used for Internet of things (IoT) applications due to low power consumption. UWB received multi-path signals arrive in clusters. Hence sparse IN samples can be detected and mitigated using some embodiments described herein. The moving difference outside of the received cluster will be high, allowing for higher probability of detection.

Figure 23:
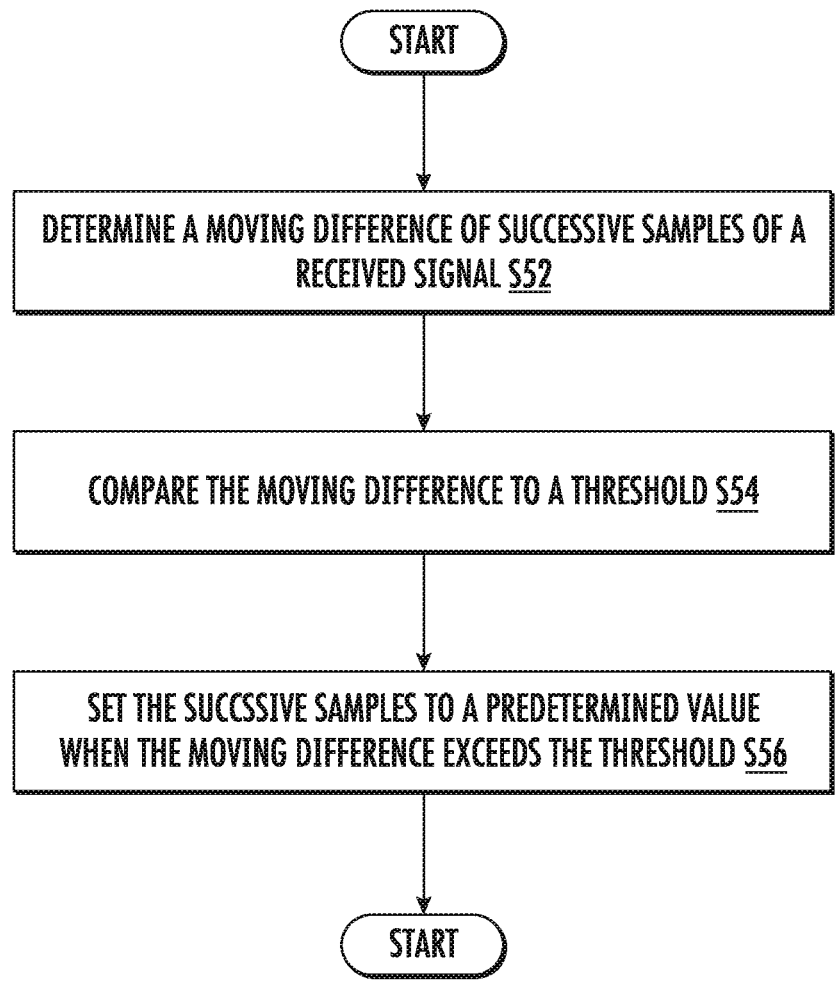
FIG. 23 is flowchart of an example process for impulsive noise suppression according to principles set forth herein.

FIG. 23 is a flowchart of an exemplary process performed in a network node 16, such as by the INSC-1 32 for impulsive noise suppression in accordance with the principles of the present disclosure. In particular, the process can be performed by the INSC-1 32 or by the INSC-2 34. Thus, one or more blocks described herein may be performed by one or more elements of network node 16 or wireless device 22, such as by one or more of processing circuitry 68, 84, processor 70, 86, and/or radio interface 62, 82 (including the INSC-1, 32, INSC-1 32-2 34). For ease of understanding, the process is described using the term "network node," but it is understood that this can refer to a wireless device as well. Network node 16, 22, such as via processing circuitry 68, 84 and/or processor 70, 86 and/or radio interface 62, 82, is configured to determine a moving difference of successive samples of a received signal (Block S52). The process also includes comparing the moving difference to a threshold (Block S54). The process further includes setting the successive samples to a predetermined value when the moving difference exceeds the threshold (Block S56).

Thus, according to one aspect, a network node 16 or wireless device 22 is configured to mitigate impulsive noise in a receiver of the network node 16 or wireless device 22. The network node 16 or wireless device 22 includes at least one of a radio interface 62, 82 and processing circuitry 68, 84 configured to determine a moving difference of successive samples of a received signal and compare the moving difference to a threshold. The at least one of the radio interface 62, 82 and processing circuitry 68, 84 is also configured to set the successive samples to a predetermined value when the moving difference exceeds the threshold.

According to this aspect, in some embodiments, the moving difference is determined once for each of M successive samples, M being an integer greater than zero. In some embodiments, the moving difference is of an absolute value of each of successive samples. In some embodiments, N absolute values of the successive samples of the received signal are stored in a circular buffer. In some embodiments, the at least one of the radio interface 62, 82 and processing circuitry 68, 84 is further configured to adaptively determine the threshold. In some embodiments, the threshold is adaptively determined based at least in part on received samples of the received signal after at least one sample is set to the predetermined value. In some embodiments, the adaptively determined threshold is based at least in part on a variance of the received signal. In some embodiments, the adaptively determined threshold is adjusted by an infinite impulse response filter. In some embodiments, the adaptively determined threshold is based at least in part on an average power of a set of samples output after the setting of successive samples to the predetermined value. In some embodiments, comparing the moving difference to the threshold includes differentiating between increased signal power and impulsive noise.

According to another aspect, a method to mitigate impulsive noise in a receiver of a network node 16 or wireless device 22 is provided. The method includes determining, via the radio interface 62, 82 and/or processing circuitry 68, 84, a moving difference of successive samples of a received signal and comparing the moving difference to a threshold. The method also includes setting, via the radio interface 62, 82 and/or processing circuitry 68, 84, the successive samples to a predetermined value when the moving difference exceeds the threshold.

According to this aspect, in some embodiments, the moving difference is determined once for each of M successive samples, M being an integer greater than zero. In some embodiments, the moving difference is of an absolute value of each of successive samples. In some embodiments, N absolute values of the successive samples of the received signal are stored in a circular buffer. In some embodiments, the method further includes adaptively determining the threshold via the radio interface 62, 82 and/or the processing circuitry 68, 84. In some embodiments, the threshold is adaptively determined based at least in part on received samples of the received signal after at least one sample is set to the predetermined value. In some embodiments, the adaptively determined threshold is based at least in part on a variance of the received signal. In some embodiments, the adaptively determined threshold is adjusted by an infinite impulse response filter. In some embodiments, the adaptively determined threshold is based at least in part on an average power of a set of samples output after the setting of successive samples to the predetermined value. In some embodiments, comparing the moving difference to the threshold includes differentiating between increased signal power and impulsive noise.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to mitigate impulsive noise in a receiver of the network node, the network node comprising:
at least one of a radio interface and processing circuitry configured to:
determine a moving difference of successive samples of a received signal;
compare the moving difference to a threshold; and
set the successive samples to a predetermined value when the moving difference exceeds the threshold.

2. The network node of claim 1, wherein the moving difference is determined once for each of M successive samples, M being an integer greater than zero.

3. The network node of claim 1, wherein the moving difference is of an absolute value of each of successive samples.

4. The network node of claim 1, wherein N absolute values of the successive samples of the received signal are stored in a circular buffer.

5. The network node of claim 1, wherein the at least one of the radio interface and processing circuitry is further configured to adaptively determine the threshold.

6. The network node of claim 5, wherein the threshold is adaptively determined based at least in part on received samples of the received signal after at least one sample is set to the predetermined value.

7. The network node of claim 5, wherein the adaptively determined threshold is based at least in part on a variance of the received signal.

8. The network node of claim 5, wherein the adaptively determined threshold is adjusted by an infinite impulse response filter.

9. The network node of claim 5, wherein the adaptively determined threshold is based at least in part on an average power of a set of samples output after the setting of successive samples to the predetermined value.

10. The network node of claim 1, wherein comparing the moving difference to the threshold includes differentiating between increased signal power and impulsive noise.

11. A method to mitigate impulsive noise in a receiver of a network node, the method comprising:
   determining a moving difference of successive samples of a received signal;
   comparing the moving difference to a threshold; and
   setting the successive samples to a predetermined value when the moving difference exceeds the threshold.

12. The method of claim 11, wherein the moving difference is determined once for each of M successive samples, M being an integer greater than zero.

13. The method of claim 11, wherein the moving difference is of an absolute value of each of successive samples.

14. The method of claim 11, wherein N absolute values of the successive samples of the received signal are stored in a circular buffer.

15. The method of claim 11, further comprising adaptively determining the threshold.

16. The method of claim 15, wherein the threshold is adaptively determined based at least in part on received samples of the received signal after at least one sample is set to the predetermined value.

17. The method of claim 15, wherein the adaptively determined threshold is based at least in part on a variance of the received signal.

18. The method of claim 15, wherein the adaptively determined threshold is adjusted by an infinite impulse response filter.

19. The method of claim 15, wherein the adaptively determined threshold is based at least in part on an average power of a set of samples output after the setting of successive samples to the predetermined value.

20. The method of claim 11, wherein comparing the moving difference to the threshold includes differentiating between increased signal power and impulsive noise.

* * * * *